United States Patent [19]

Goldstein

[11] 4,360,739
[45] Nov. 23, 1982

[54] WALL SWITCH OPENING MOUNTED POWER CIRCUIT TIMER-CONTROLLER

[75] Inventor: Richard Goldstein, Northbrook, Ill.

[73] Assignee: Dynascan Corporation, Chicago, Ill.

[21] Appl. No.: 251,174

[22] Filed: Apr. 6, 1981

Related U.S. Application Data

[63] Continuation-in-part of Ser. No. 22,453, Mar. 21, 1979.

[51] Int. Cl.³ .................. H01H 9/02; H01H 9/16; H01H 43/04
[52] U.S. Cl. ............................ 307/132 E; 307/140; 307/141.4; 307/157; 315/360; 200/293
[58] Field of Search ............... 307/116, 141, 141.4, 307/140, 130, 132 E, 143, 157, 96, 115; 340/309.4, 309.5, 309.1; 315/360, 246, 362; 200/293, 297; 361/196, 332, 334, 380

[56] References Cited

U.S. PATENT DOCUMENTS

| | | | |
|---|---|---|---|
| 3,239,723 | 3/1966 | Washington et al. | 307/130 X |
| 4,002,925 | 1/1977 | Monahan | 307/141 |
| 4,035,661 | 7/1977 | Carlson | 307/141 |
| 4,045,629 | 8/1977 | Anzani | 200/293 |
| 4,151,425 | 4/1979 | Cappa | 307/130 |
| 4,213,063 | 7/1980 | Jones | 307/141 |
| 4,255,637 | 3/1981 | Matsuda | 200/293 |
| 4,259,618 | 3/1981 | Nilssen | 307/140 X |

Primary Examiner—Thomas W. Brown
Assistant Examiner—S. D. Schreyer
Attorney, Agent, or Firm—Wallenstein, Wagner, Hattis, Strampel & Aubel

[57] ABSTRACT

The controller comprises a rear sub-assembly to be mounted in a conventional toggle wall switch opening, a conventional toggle switch cover plate with a vertical toggle switch operating arm-receiving slot, the plate to extend over the rear sub-assembly and being of a size to overlap the wall switch opening, and a front sub-assembly to be mounted over the cover plate. An anchoring screw-receiving opening in the rear of sub-assembly is accessible from the front of the front sub-assembly through the cover plate slot. A screw passing through an opening in the front sub-assembly and cover plate slot anchors at least partially the front sub-assembly and the cover plate to the rear sub-assembly. A rotatable and depressible shaft extends from the rear-sub-assembly and passes through the cover plate slot and the front sub-assembly. A timer and on-off switch operating knob removably fits over the shaft to expose the screw when the knob is removed from the shaft.

28 Claims, 14 Drawing Figures

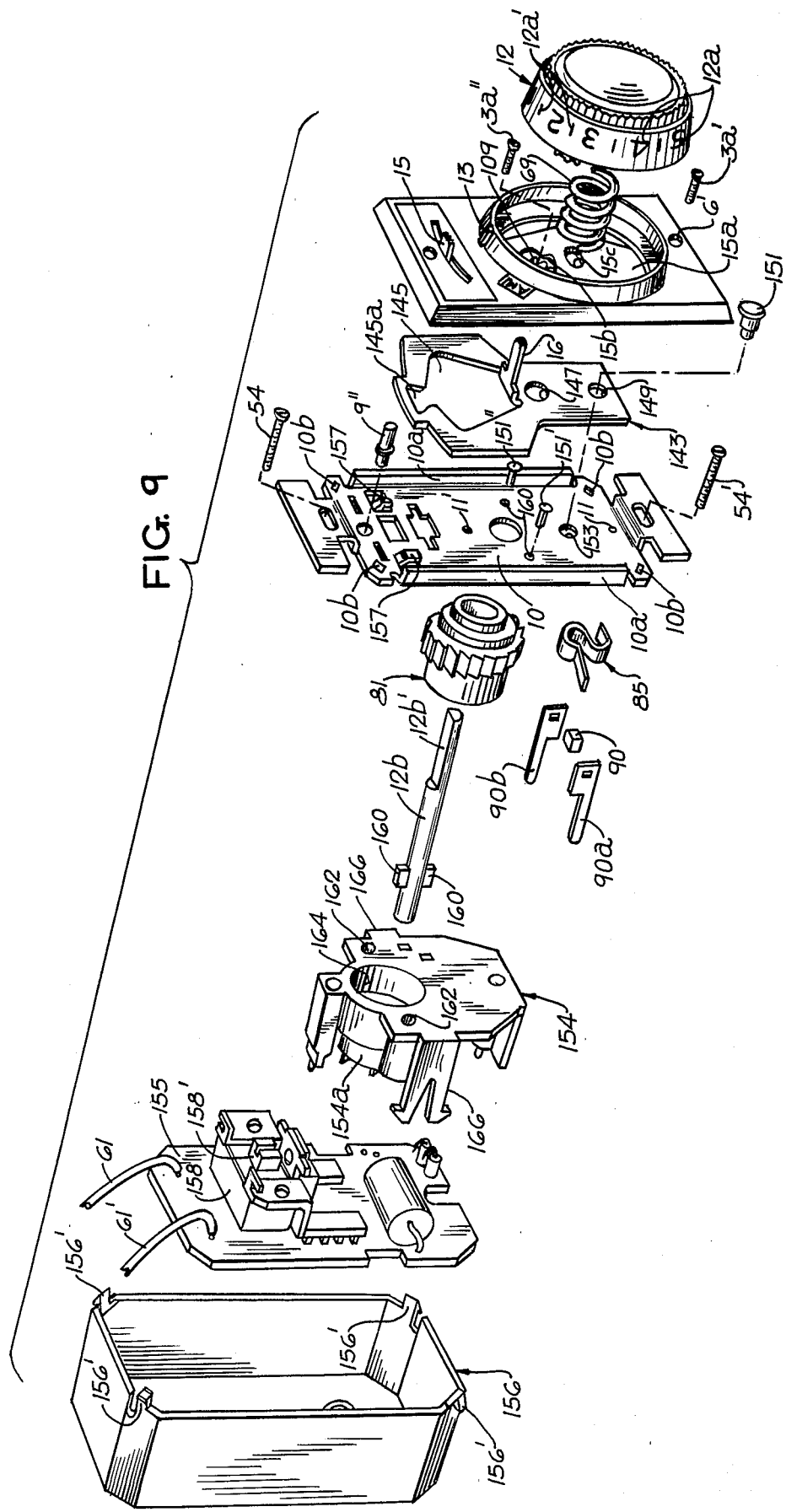

WALL SWITCH OPENING MOUNTED POWER CIRCUIT TIMER-CONTROLLER

RELATED APPLICATION

This application is a continuation-in-part of application Ser. No. 22,453, filed Mar. 21, 1979 and entitled Timer and Power Control System.

BACKGROUND OF INVENTION

The present invention relates to control devices for electrical power circuits like lighting and appliance circuits in residences. In recent years a large demand for automatic and/or remote control of residential lighting has developed as a result of the increased crime rate involving home invasions. Automatically timed control of lighting has become widely accepted as a significant deterrent for prevention of home invasion. Also, the remote operation of lights, either automatically, from an intrusion alarm system, or from a remote location such as a bedside unit, is a desirable feature of a home protection system.

One type of automatic light timer commonly available today has motor driven mechanically activated switches. The least expensive type provides a single "on" time selection and a single "off" time selection for each 24 hour period. Some mechanical timers provide for the selection of one hour "on" or "off" intervals that can be arranged in any pattern. The pattern is repeated every 24 hours. The most popular timer type is self contained, with a two-prong plug interval with a housing therefor for directly plugging into the usual household electrical outlet. The housing also has an integral socket for plugging in the lamp or appliance to be controlled. Another timer type has a power cord and is designed for setting on the floor or table top. Some manufacturers offer timers for permanent wall mounted installation to control lighting fixtures. To further enhance the usefulness of automatic light timers as a deterrent against home invasions, some timers have a feature that alters the actual "on" time from day to day so that a more probable "lived in" pattern results.

Mechanical motor driven timers have achieved great popularity because of their low cost. However, because of the limitations of mechanical systems, mechanical timers presently in use suffer from a number of disadvantages. Thus, mechanical timers tend to be unreliable and noisy (especially after some period of use), forcing many owners to abandon their use in quiet areas such as studies and bedrooms. Mechanical timers are also large and bulky and therefore have not lent themselves widely to convenient table-top use with "decorator" type styling. The use and bulk of mechanical timers precludes their installation into a flush device electrical box, such as commonly houses wall switches for the control of outdoor or ceiling lighting fixtures.

Inexpensive mechanical timers have "MANUAL/AUTOMATIC" settings on a switch selector. When the timer is in the "AUTOMATIC" mode usually the light cannot be turned on or off without taking the timer out of the "AUTOMATIC" mode. Thus if it is desired to change the light from its present automatically programmed state to the opposite state (ON to OFF or OFF to ON) the user must remember to return to "AUTOMATIC" before leaving the room if he wants programmed control to continue. However, some mechanical timers heretofore developed have an automatic override feature where the automatic control returns to operation automatically when the manual setting and automatic setting subsequently correspond.

There has also been marketed recently a relatively expensive electric timer which is sufficiently compact that it fits into a toggle wall switch opening. However, this timer completely replaces an existing single toggle switch station and the cover plate thereat and is thus not mountable upon or behind any selected station of a multi-station toggle switch installation using a conventional cover plate, which is most desirable for the most successful marketing of a timer of the type being described. Also, this electric timer is not flexibly programmable by the user; rather, fixed individual programming timing modules are initially installed by the manufacturer which are changed by an electrician by the substitution of a different module to effect a change in the light turn-on or light turn-off program.

It is, accordingly, an object of the invention to provide an electric timer which has a housing assembly construction which enables it to be mounted in place of a toggle switch installation associated with any station of a single or multi-station cover plate without requiring the replacement of the cover plate or interferring with the toggle switches of the other stations which may be associated with the cover plate.

A related object of the invention is to provide a timer as described which has manual controls which enable the timer to be easily programmed by the user to provide a wide selection of ON and OFF time intervals.

Still another object of the invention is to provide a timer satisfying any one or more, and preferably all of the previously stated objectives and which can be made to sell for a price which is attractive to a mass market, and which can be easily installed and used by simple instructions understandable by the average home owner.

SUMMARY OF THE INVENTION

In accordance with one of the features of the invention, a twenty-four hour repeat cycle timer-controller comprises front and rear housing sub-assemblies of such small size that they respectively fit behind and in front of one station of a conventional toggle switch cover plate overlying a conventional flush-type toggle switch-receiving switch box. The front housing sub-assembly preferably has mounted on the front control panel thereof a manually operable push button or other control means operable successively to energize and de-energize the power circuit involved in the normal manner, whether or not the controller is in its timer-on or timer-off condition, so that this control overrides the control of the power circuit timer. In addition to this power control means there is movably mounted on this control panel a time setting control for setting "present time" and subsequent time settings which will identify the beginning of timing intervals during which ON or OFF markers are set into a storage location of a memory. The power and time setting controls are preferably operated by a single rotatable time dial knob which is rotated to set time and momentarily depressible to turn the light circuit on and off.

The electric circuit portions of the controller are in the rear housing sub-assembly located behind the cover plate and mountable in the switch box in place of a conventional toggle switch unit and anchored to the box in the same way as the conventional toggle switch unit is so anchored.

In accordance with a specific aspect of the invention, the front housing sub-assembly is secured to the rear housing sub-assembly as by screw which passes through the vertical toggle switch arm-receiving slot of the cover plate. This screw is exposed by pulling the time dial knob from a control shaft which projects forwardly from the rear housing sub-assembly through said cover plate slot and openings in the front housing sub-assembly.

In accordance with another aspect of the invention, the control panel of the front housing sub-assembly also advantageously includes a timer on-clear lever preferably mounted for pivotable movement in the front housing sub-assembly. This lever makes connection with a control arm projecting through the cover plate from the rear housing sub-assembly.

In accordance with a preferred form of the invention, at least one of the screw-receiving holes located above and below each vertical slot of the cover plate most advantageously is utilized to receive light from an indicator lamp preferably located in the rear housing sub-assembly, and the other of these holes receives an anchoring screw for further anchoring the front housing sub-assembly to the rear housing sub-assembly. Less desirably, the other of these holes may be utilized to receive light from a second indicator lamp also mounted on the rear housing sub-assembly. The one or two indicator lamps indicate the not-programmed and programmed modes of operation of the timer. Since two screws are preferred for anchoring the front housing sub-assembly to the rear housing sub-assembly, a single lamp is preferred which indicates the programmed and not-programmed modes of timer operation by flashing and steady light indication, respectively.

With the various features of the invention just described it is apparent that the timer of the invention can be mounted at any desired station of a single or multi-station cover plate. This is not readily possible with prior wall switch opening mounted timers.

Various other aspects of the invention deal with specific details of the timer housing construction which enables it to be fabricated in a simple, inexpensive and reliable manner and enables the user to manually program the timer by following easy-to-understand instructions and enables the electric circuit controlled thereby to be operable in only one manner thereby. Thus, an aspect of the invention useable in electric timers of many types whether or not mounted in and over a wall switch opening as described is the provision of a unique timer dial knob construction and arrangement with respect to numbered markings representing the hours 1 through 12 and an index mark. This aspect of the invention enables fast manual programming of the timer to be achieved by means which enables the time dial knob to advance a control shaft carrying the knob only when it is rotated in one direction which brings the numbered markings opposite the index mark in order of progressively increasing value. The numbered markings represent the beginnings of successive time intervals of preferably one quarter or half-hour intervals indicated by appropriate indicia between the numbered hour markings. The shaft is preferably mounted so that it is detented in discrete steps which bring each hour and fractional hour markings, where desired, opposite an index mark. As the user moves a marking opposite the index mark which represents a time where a change in the state of the power circuit involved is to be achieved, he merely depresses the time dial knob. Each step of the control shaft generates a pulse which accesses a different storage location in memory to set a number corresponding to the current condition of the power circuit which is changed each time the time dial knob is depressed. Since the control shaft can be rotated in only one direction, the control circuit responding to the pulses generated by control shaft rotation need not be complicated by the need for sensing the direction of shaft rotation.

DESCRIPTION OF DRAWINGS

FIG. 9 is a view of the front sub-assembly and the control knob each shown in their assembled form, and an exploded view of the parts of the rear sub-assembly.

DESCRIPTION OF EXEMPLARY FORM OF THE INVENTION

Figure 1:
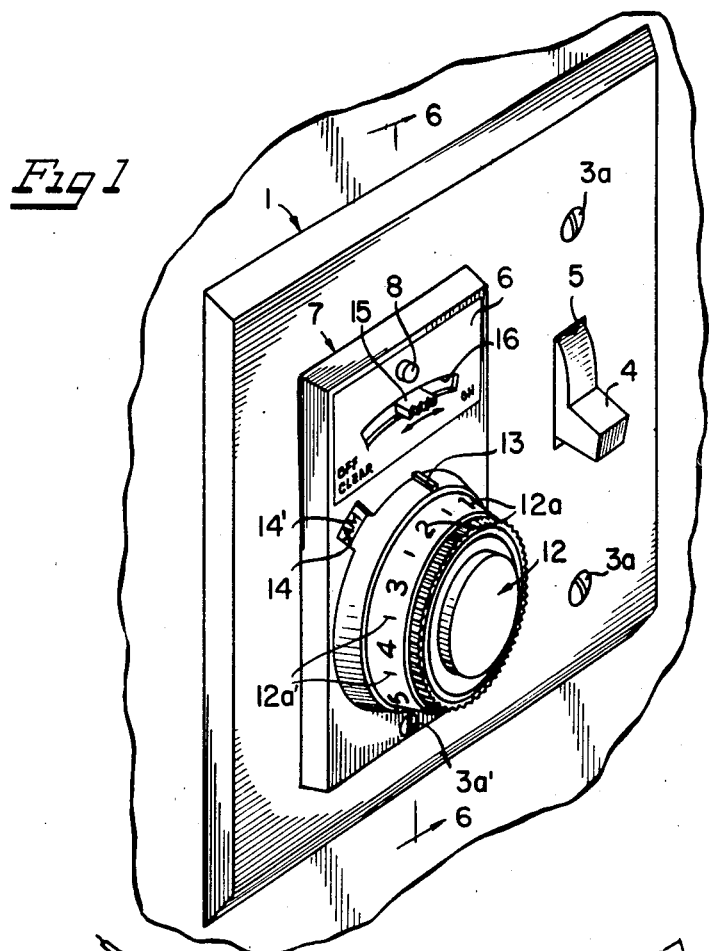
FIG. 1 is a perspective view of a dual-station cover plate mounted on a wall in a conventional way, with one of the toggle switch stations thereof replaced by the timer of the present invention.
Figure 2:
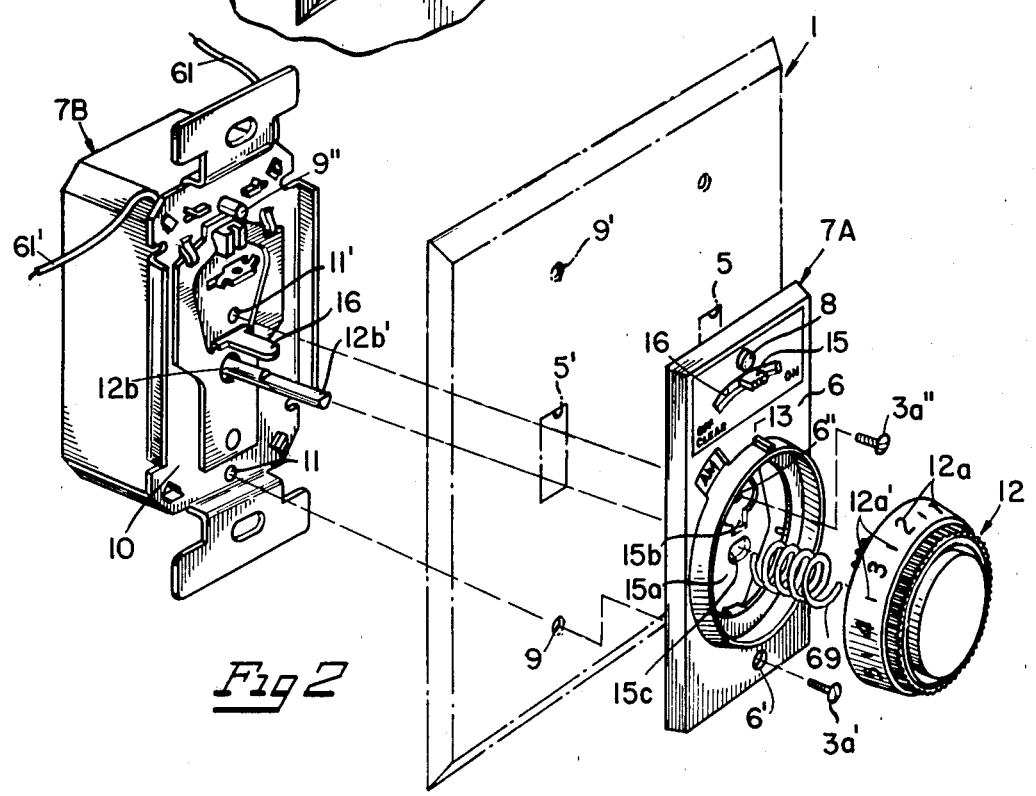
FIG. 2 is an exploded view showing the front and rear sub-assemblies making up the timer of FIG. 1, with the rotatable and depressible time dial knob removed from the front control panel of the front sub-assembly to expose the anchoring hole for securing the front sub-assembly, and there also being shown in dashed lines the physical relationship between various interconnecting parts of the front and rear sub-assemblies and various apertures in the wall switch station cover plate shown in dashed lines through which these parts pass.

Referring now to FIGS. 1 and 2, there is shown a typical dual switch station wall switch cover plate 1 which is mounted over a wall switch opening normally accommodating two toggle switches. As illustrated, the cover plate 1 has on one side thereof a vertical toggle arm-receiving slot 5 through which projects the usual toggle switch arm 4 for operating a switch unit mounted behind the plate upon a metal strap (not shown), as is conventional. The toggle switch arm 4 controls a light circuit different from that controlled by the timer to be described. The controller of the present invention illustrated generally by reference numberal 7 has front and rear sub-assemblies 7A and 7B mounted respectively in front of and behind the cover plate 1. The cover plate 1 is anchored in place in part by anchoring screws 3a—3a above and below the cover plate slot 5. The front sub-assembly 7A has a control panel 6 upon which various manually operable controls are accessible. A lens element and key-forming means 8 on the control panel 6 is aligned with an empty screw-receiving hole 9' of the cover plate 1 so as to receive light from a lighting element (not shown) behind a light tube 9'' on the rear sub-assembly 7B and to key the position of the sub-assembly 7A.

An anchoring screw 3a' (readable on "second fastener means" in the claims) may be provided to anchor the front sub-assembly 7A and the cover plate 1 of a front wall 10 of the sub-assembly 7B through control panel opening 6' and cover plate fastener-receiving hole 9. The screw 3a' threads into a hole 11 in front wall 10 of the rear sub-assembly 7B. A screw 3a'', (readable upon "first fastener means" in the claims) accessible when a control knob 12 (readable on "manually engageable means" in the claims) is pulled from the control panel 6 and passed through openings 15b and 6'' in the front sub-assembly 7A and the other vertical cover plate slot 5', threads into a hole 11' in the wall 10 to anchor the cover plate 1 and the front sub-assembly 7A to the rear sub-assembly 7B.

The control knob 12 is a rotatable and depressible time dial knob supported so it has 24 discrete detented positions and each discrete position thereof brings a new half-hour time setting opposite an index mark 13 on the panel 6. The knob 12 is press-fitted over a rotatable and depressible shaft 12b (readable upon "manually operable means" in the claims) and projecting from the rear sub-assembly 7B and passing through cover plate slot 5'. The knob 12 has on the side thereof hour indicating indicia or markers 12a, there being 12 such markers representing 12 hours of the day, and half hour-indicating markers 12a' midway between the hour indicating markers. The markers 12a and 12a' are individually positionable opposite an index mark 13 on the panel 6 to identify the end or beginning of the various half-hour time intervals during which the light circuit controlled by the timer is to be energized or de-energized in accordance with a light control program established by the timer. When the knob 12 is rotated through a first 12 hour period, an "AM" or "PM" marker 14' previously visible in an opening 14 in the control panel 6 will change to the other of same, so that the particular "AM" or "PM" hour of the day is indicated. The rotatable time dial knob 12 is depressible so as to act as a power on-off switch control and as a turn-on and turn-off marker signal generating control during the initial programming of the timer. For example, after the knob 12 is initially rotated to a present time setting and depressed once to "enter" present time, each subsequent depression will generally alternately energize and de-energize the lighting circuit involved and, during initial programming of the timer, will change the type of marker stored in the timer memory. In a fast programming of the timer, the knob 12 is rotated to all of the various hour or half-hour time setting positions beyond the first turn-on period, and is depressed once each time setting where a change in the condition of the light is desired at the time setting involved. ON or OFF markers are set into a storage location of memory corresponding to the light condition involved.

There is also exposed on the front of the panel 6 a controller condition setting arm 15 (readable upon "additional manually engageable means" in the claims) and which is movable between two stable extreme positions within a horizontal slot 16' on the panel 6. The arm 15 extends from a shiftable plate 15a in the front sub-assembly 7A which has the opening 15b receiving a switch actuating tongue 16 projecting forwardly from the rear sub-assembly 7B. The extreme left-hand position of arm 15 is an "OFF/CLEAR" position where the unit is turned off and the power circuit involved is completely interrupted by an air gap. When the arm 15 is in its extreme right-hand position, the timer is in an "ON" position to be programmed and, after completion of programming, unless the knob is depressed in a special manner, the light circuit involved is energized by the markers stored in the timer memory, unless such automatic control is overridden by depression of the knob 12 which will reverse the condition of the light circuit involved.

Figure 3:
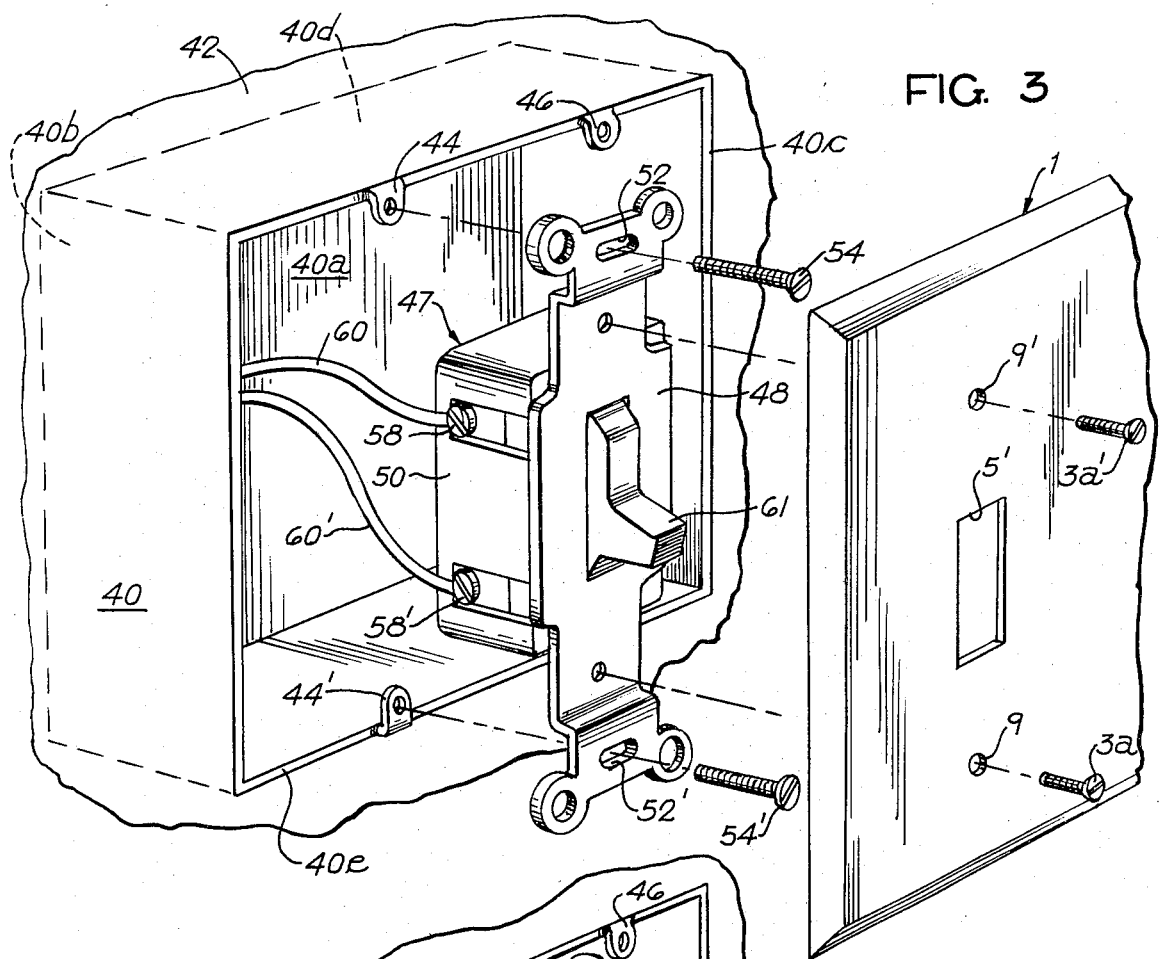
FIG. 3 is a perspective exploded view showing a conventional cover plate and toggle wall switch cover plate pulled from a conventional flush wall switch box after removal of the cover plate and showing the manner in which the wall switch box, wall switch and cover plate are interconnected by screws.

While some aspects of the invention deal with the details of construction of the sub-assemblies 7A and 7B, which will be later described, the more basic aspects of the invention deal with the basic relationship of the front and rear sub-assemblies 7A and 7B and the manner in which they relate to the cover plate 1, as also described, so that they can replace an existing wall switch station associated with a single or multi-station cover plate. FIG. 3 shows a flush wall switch box 40 including a rear wall 40a, side walls 40b and 40c and top and bottom walls 40d and 40e. The side, top and bottom walls terminate in a common plane which is roughly flush with the adjacent wall 42 of the room involved. The top and bottom walls 40d and 40e have extending inwardly therefrom the usual pairs of anchoring holes 44-44' and 46-46' vertically aligned at opposite halves of the wall switch box 40. In FIG. 3 a toggle switch unit 47 is shown having the usual mounting strap 48 at the front thereof with upper and lower horizontally elongated slots 52 and 52' at the top and bottom thereof through which slots screws 54 and 54' pass to make threaded engagement with the threaded holes 44-44' on the wall switch box 40. The mounting strap 48 is secured to a wall switch housing 50 having screw terminals 58-58' for anchoring the bared ends of insulated conductors 60-60'. One of the conductors 60 extends to an AC power line and the other conductor 60' extends to the lighting circuit to be controlled by the toggle switch 47. The toggle switch has a toggle switch arm 61 which projects through the vertical slot 5' from the rear of the cover plate 1 previously described. The cover plate 1 is anchored in place to the mounting strap 48 by screws 3a'-3a passing respectively through the circular holes 9'-9 in the cover plate 1.

Figure 4:
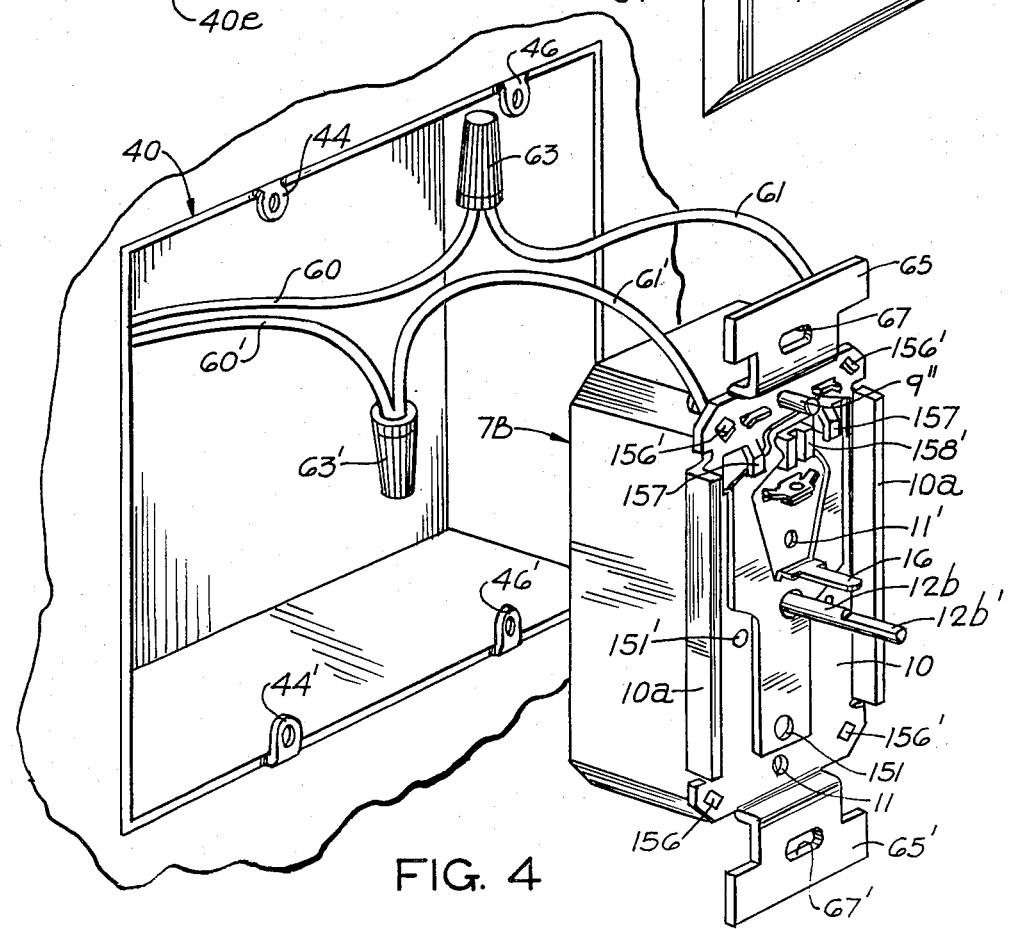
FIG. 4 shows a perspective exploded view of the rear housing assembly and the wall switch box of FIG. 3, showing how the rear sub-assembly of the timer replaces the wall switch shown in FIG. 3.

In FIG. 4, the toggle switch 47 is shown replaced by the timer rear sub-assembly 7B. The rear sub-assembly 7B has a pair of conductors 61 and 61' respectively connected to the bared ends of the previously mentioned conductors 60 and 60' in any suitable way, such as by connector caps 63-63' which frictionally receive the bared ends of the conductor pairs 60-61 and 60'-61'.

Figure 6:
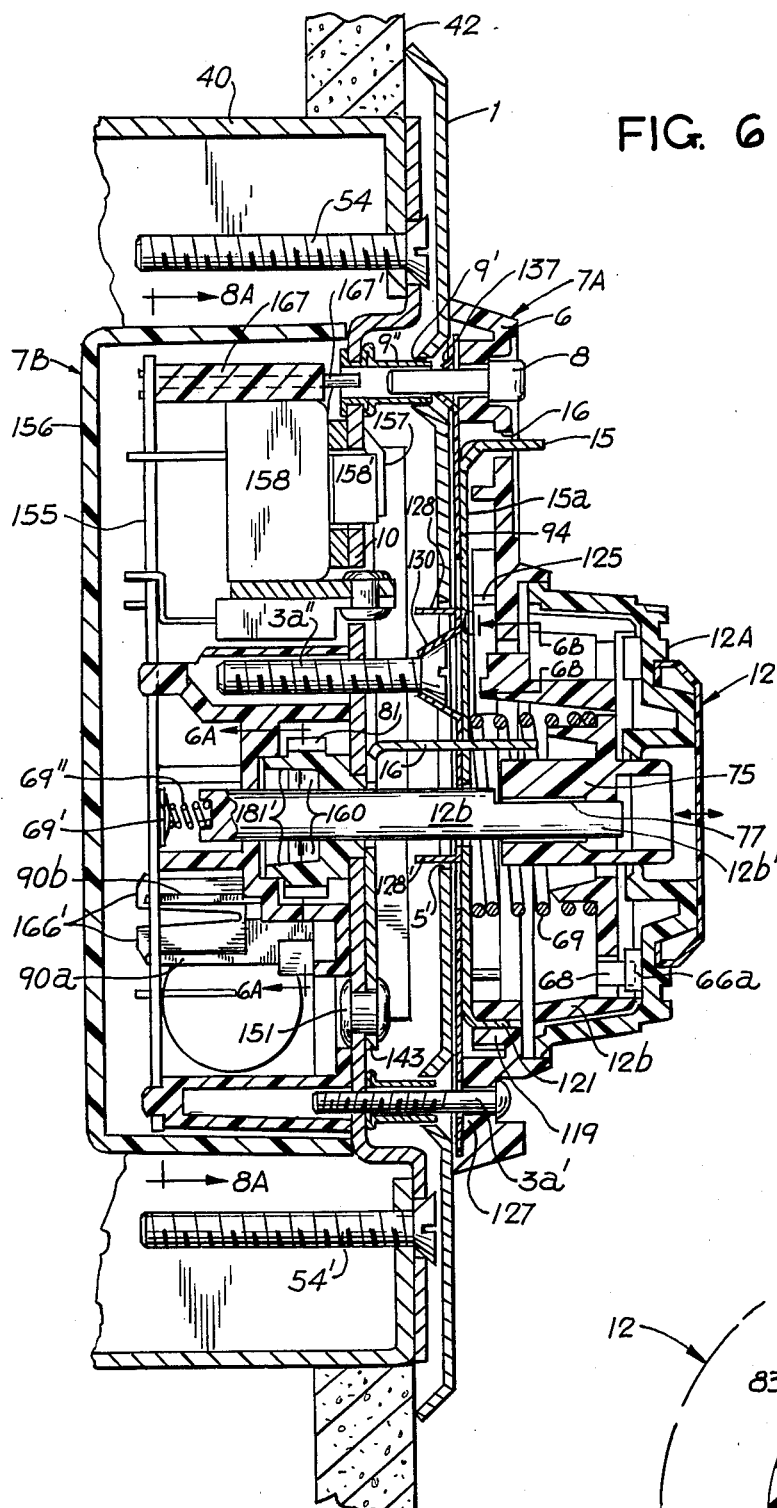
FIG. 6 is a greatly enlarged central vertical sectional view of the timer shown in FIG. 1, taken along section line 6—6 therein.
Figure 6B:
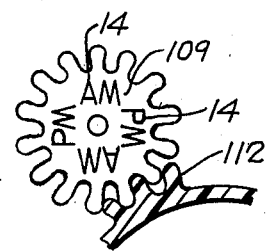
FIG. 6B is a fragmentary sectional view through the portion of the front sub-assembly which includes the "AM" and "PM" gear and the gear portion of the control knob which engages the same.

The front wall 10 of the rear sub-assembly 7B has horizontally elongated slots 67-67' in top and bottom mounting wings 65-65' thereof, the slots 67-67' receiving the screws 54-54' shown in FIG. 3 to anchor the rear sub-assembly 7B to the holes 44-44' in the same manner in which the toggle switch 47 is anchored to the holes 44-44', as best shown in FIG. 3. When the cover plate 1 is applied over the rear sub-assembly 7B, the switch actuating tongue 16 and the shaft 12b project through the vertical slot 5' in the cover plate 1. Also, the light tube 9" of the rear sub-assembly 7B becomes positioned into the cover plate hole 9' and the holes 11'-11 of the wall 10 are aligned with the cover plate slot 5' and hole 9 (FIG. 2). Then, the front sub-assembly 7A is mounted by the screws 3a" and 3a' upon the cover plate 1, the shaft 12b and switch actuating tongue 16 then passing through openings 15b and 15c of the front sub-assembly 7A. A coil spring 69 carried by the time dial knob and surrounding the rotatable and depressible control shaft 12b and tongue 16 forms a resilient means urging the time dial knob 12 and the control shaft 12b outwardly so that the spring 69 adds to the resilient force of a return spring 69" of a switch unit 69' (FIG. 6). The springs 69 and 69" thus urge control knob 12 on the associated shaft 12b outwardly so the same can be depressed and operate switch 69' momentarily.

Figure 5:
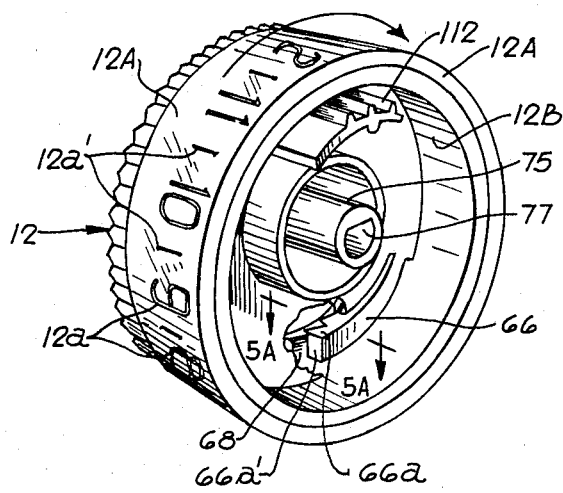
FIG. 5 is an enlarged perspective view of the rear portion of the rotatable and depressible time dial knob shown in FIG. 2, the parts thereof forming a one-way clutch and an AM and PM gear plate operating gear visible within the knob.
Figure 5A:
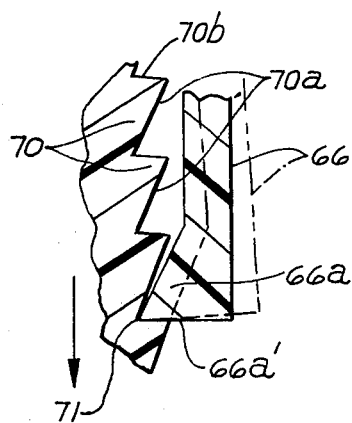
FIG. 5A is a greatly enlarged transverse sectional view through a portion of the knob shown in FIG. 5, as seen along section line 5A—5A.

For details of construction of the time dial knob 12, reference should now be made first to FIGS. 5 and 5A. The knob 12 includes an outer knob member 12A mounted over an inner knob member 12B. The outer knob member is shown as an opaque member having on the outer periphery thereof the previously described hour markings 12a and half-hour markers 12a'. Since the half-hour markers 12a' are adjacent and related to the adjacent hour numbers, the half-hour markers are included in what is sometimes referred to as "numbered markings". (However, the outer knob member could be transparent, in which case the inner knob member would have these markings if the logic of the timer circuitry was designed like that disclosed in co-pending application Ser. No. 132,088, filed Mar. 20, 1980.) The outer control knob member 12A is connected by a one-way clutch to the inner knob member 12B so that the outer knob member 12A is rotatable in a counter-clockwise direction without transmitting the rotation thereof to the inner knob member 12B. This avoids damaging stresses on the knob assembly and informs the user without doubt that the outer knob member should be rotated in the opposite direction. Rotation of the outer knob member 12A in a clockwise direction imparts rotation to the inner knob member 12B and brings the numbered markings opposite index mark 13 in progressively increasing order, which is most suitable for programming. To this end, the inner knob member 12B has an arcuate resilient pawl-forming arm 66 having on the forwardly facing side of the end thereof a pointed pawl-forming portion 66a. The resilient arm 66 forces the pawl-forming portion 66a against a rearwardly facing ratchet teeth-forming surface 68 of the outer knob member 12A. The ratchet teeth-forming surface 68 presents individual teeth 70 each having a gradually rising leading side 70a and a sharply dropping trailing side 70b. The pointed pawl-forming portion 66a normally rests in the crotch 71 formed between the sharply dropping side 70b of one of the teeth 70 and the gradually rising side 70a of the next tooth. Counter-clockwise rotation of the outer knob 12A causes the pointed pawl-forming portion 66a to ride up the gradually rising side 70a of the adjacent tooth 70 and so slip by the same. Clockwise rotation of the outer knob member 12A causes the leading flat side 66a' of the pawl-forming portion 66a to bear against the sharply trailing side 70b of the adjacent tooth 70 so that the inner knob member 12B is rotated with the outer knob member 12A.

Figure 6A:
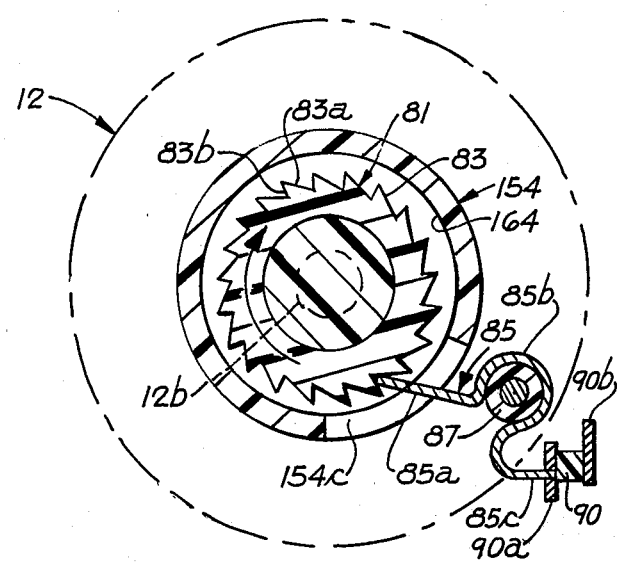
FIG. 6A is a sectional view through a detent and pulse generating portion of the timer shown in FIG. 6, as seen along section line 6A—6A therein.

The inner knob member 12B has a rearwardly projecting hollow hub 75 with a non-circular socket 77 into which frictionally fits the non-circular end portion 12b' of control shaft 12b (FIG. 6). This shaft 12b carries a ratchet wheel-forming cam 81 (FIG. 6A) in the rear sub-assembly 7B which cam has ratchet teeth-forming lobes 83. Each of these ratchet teeth-forming lobes 83 has a gradually rising side 83a and a sharply dropping side 83b. The cam 81 together with an associate pawl-forming and force-transmitting spring 85 forming a detenting means to provide 24 discrete positions for the shaft 12b where the numbered markings 12a and 12a' on the outer knob member 12A are brought individually into alignment with the stationery index mark 13. Spring 85 has a flat pawl-forming end 85a which normally urges the cam 81 in a counter-clockwise direction into a position where the pawl-forming end 85a engages the crotch of the recess defined between adjacent ratchet teeth-forming lobes 83 of the cam. It can thus be seen that as the knob 12 is rotated a full revolution in a clockwise direction, all of the hour numbers and one-half hour markers 12a and 12a' will have been brought into alignment with the index mark 13.

The flat pawl-forming end 85a of the spring 85 joins a rounded portion 85b which closely extends part way around a cylindrical pivot-forming rod 87, the spring terminating in a flat end 85c which bears against one side of a stationery piezo-electric ceramic element 90. The flat end 85c of the spring 85 places an initial compressive force on the piezo-electric element 90, which force is progressively increased as the cam 81 is rotated in a clockwise direction to move the pawl-forming end 85a of the spring 85 toward the other end 85c thereof, this action increasing the compressive force of the flat end 85c against the piezo-electric element 90 until most of this force is suddenly relieved, as the pawl-forming end 85a of spring 85 drops suddenly from the high point of a cam lobe. This produces an audible "click" and generates a large amplitude damped sine wave voltage at output terminal blades 90a and 90b placed at opposite surfaces of the piezo-electric element 90. There is practically little or no voltage generated across the terminals blades 90a and 90b when the stress on the piezo-electric element 90 is slowly increased as the pawl-forming end 85a of spring 85 rides up the gradually rising side 85a of a cam lobe 83, so that any "teasing" of the time dial knob 12 or ordinary vibration will not generate any count error-producing pulses at the piezo-electric element terminal blades 90a and 90b.

Figure 7:
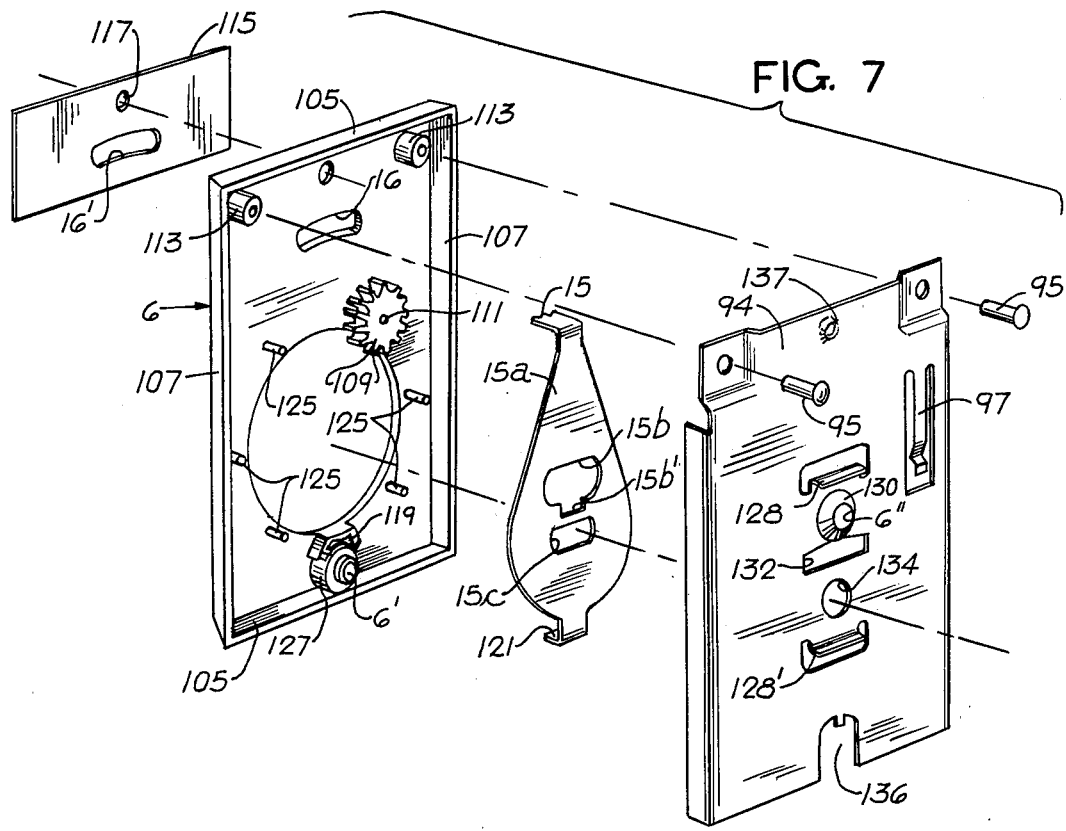
FIG. 7 is an exploded view of the main parts making up the front sub-assembly.

Referring now more particularly to FIGS. 6 and 7, the details of the front sub-assembly 7A is there shown. This assembly includes a rear metal plate 94 which is secured by rivets 95—95 to bosses 113—113 projecting rearwardly from the rear face of the control panel 6, which may be made of a molded synthetic plastic material. The control panel 6 has peripheral walls 105—105 and 107—107 which form a recess into which the plate 94 extends. The plate 94 bears against a series of bosses 125 extending rearwardly from the control panel 6. Defined between the rear plate 94 and the control panel 6 is a space within which is movably mounted the aforementioned swingable plate 15a and an "AM"-"PM" gear 109 rotatably mounted over a pin 111 extending from the control panel 6. Struck from the rear plate 94 is a retaining tongue 97 which bears against the gear 109 to retain the same in a stable rotatable condition upon the rear face of the control panel 6. When the knob 12 is in position over the shaft 12b, a narrow gear sector 112 (FIG. 5) or the inner knob member 12B engages the "AM" and "PM" gear 109 once per revolution of the knob, to shift the gear one-quarter of a revolution to bring the "AM" and "PM" marker 14 into view in the window or opening 14 in the control panel 6.

The swingable plate 15a has a pivot-forming projecting end 121 which fits into an apertured boss 119 which permits a limited pivoting of the shiftable plate 15a. The condition setting control arm 15 projecting from the shiftable plate 15a passes through apertures 16 and 16' formed in the control panel 6 and a metal plate 115 and is movable within the defining walls of these apertures. The shiftable plate 15a has a central opening 15c through which the control shaft 12b projects. The metal plate 115 is cemented or otherwise secured in a recess on the front face of the control panel 6. The metal plate 115 has printed material written which identifies the name of the timer manufacturer, and the "OFF CLEAR" and "ON" positions of the control arm 15.

The control panel 6 has a rearwardly projecting apertured boss 127 in which is formed the aforementioned screw-receiving hole 6' referred to in connection with the description of FIG. 2. The boss 127 also acts as a positioning projection which passes into a slot 136 formed in the rear plate 94 of the front sub-assembly 7A. The rear plate 94 also has a rearwardly projecting boss 130 in which is formed the aforementioned screw-receiving hole 6" used to anchor the front sub-assembly 7A to the rear sub-assembly 7B by means of the screw 3a". The rear plate 94 also has rearwardly projecting tongues 128 and 128' (readable on "rearwardly projecting means" in the claims) which form positioning shoulders which engage the upper and lower margins of the switch arm-receiving slot 5' in the cover plate 1, as best shown in FIG. 6. The aforementioned lens unit 8 is anchored in an aperture 137 in the rear plate 94 and acts as a keying means which enters the cover plate aperture 9' to aid in the positioning of the front sub-assembly 7A upon the cover plate.

Refer now more particularly to FIGS. 6 and 9 which show the details of the rear sub-assembly 7B. The front wall 10 has extending forwardly from the vertical margins thereon flanges 10a—10a. The wall 10 has pivotally mounted on the front face thereon a pivotable switch actuating plate 143 having a central opening 147 through which the control shaft 12b extends loosely so that the plate 143 can be shifted between its extreme positions by the movement of the timer condition setting arm 15. The plate 143 is anchored by a pivot-forming rivet 151 passing through aligned apertures 149 and 153 of the plate 143 and wall 10. The switch actuating tongue 16 is struck from the plate 143 at the bottom margin of a large opening 145 thereof. It will be recalled that the tongue 16 passes from the rear sub-assembly through the cover plate slot 5' into the front sub-assembly 7A where it engages the defining walls of the opening 15b in the shiftable plate 15a of the front sub-assembly 7A. The plate 15a is rocked by movement of the timer condition setting arm 15 extending therefrom.

The pivotable plate 143 is held in moveable relation against the wall 10 by the guideway-performing projections 157—157 struck from the wall 10. The opening 145 in the plate 143 has a constricted portion 145a at the top thereon which receives the actuating nose 158' of a switch 158 (FIG. 6) mounted on a circuit board 155. Thus, a shifting of the plate 143 will cause the defining walls of the constructed portion 145a of plate 143 to shift the operating nose 158' to effect the "OFF/CLEAR" and "TIMER ON" conditions of operation of the timer.

Anchored to the rear face of the wall 10 is a molded plastic parts mounting body 154. The mounting body 154 is anchored in place by the aforementioned pivot-forming rivet 151 and additional rivets 151'-151" (FIGS. 8 and 8A) passing through apertures 160—160 in the wall 10 and corresponding aligning apertures 162—162 in the mounting body 154. The mounting body 154 has a hollow cylindrical portion 164 which completely receives the cam 81 for rotation therein. The mounting body 154 also has a boss 154a (FIG. 8A) with a recess 154a' which receives the piezo-electric element 90 and the associated terminals 90a-90b. The mounting body portion 154 has an opening 154c which exposes the cam lobes 83 and permits the pawl forming end 85a of the spring 85 to engage the cam lobes.

The control shaft 12b has lateral projections 160—160 which engage with similarly shaped slots 81'—81' (FIG. 6) formed in the mounting body portion 154 so that rotation of the knob 12 will impart rotation to the cam 81.

Figure 8:
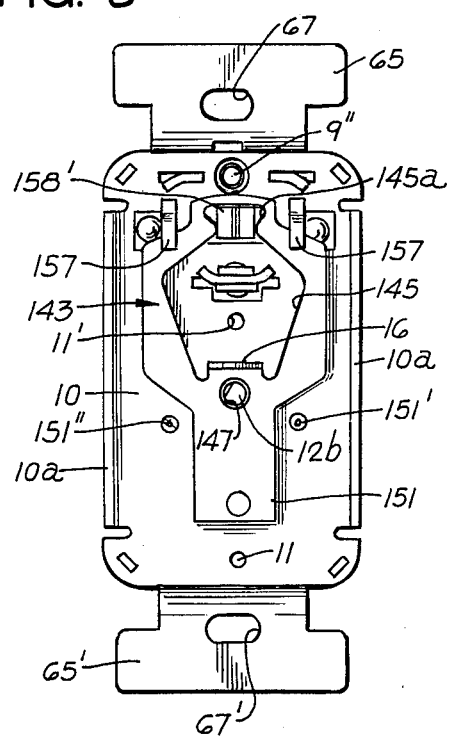
FIG. 8 is a front elevational view of the rear sub-assembly.
Figure 8A:
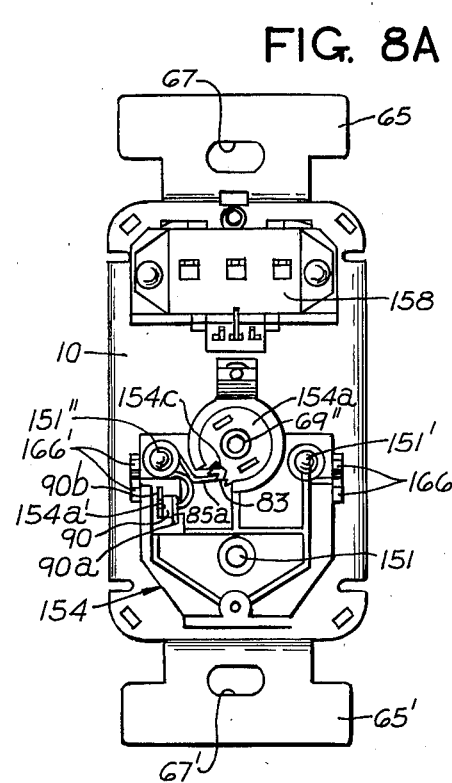
FIG. 8A is a sectional view through the rear sub-assembly, as seen along section line 8A—8A in FIG. 6.

The mounting body 154 has pairs of rearwardly extending projecting portions 166—166, and 166'—166' which pass through apertures or slots in the circuit board 155 to position the control board with respect to these projections. A housing 156 for the rear sub-assembly 7B encloses the circuit board 155, the mounting body 154, the front wall 10 and the various other parts described. The housing 156 has anchoring projections 156' which pass through corresponding apertures 10b formed in the front wall 10. The anchoring projections 156' are deformed to secure the housing 156 to the front wall 10, as shown in FIGS. 2 and 8.

The circuit board 155 carries switch unit 69' including spring 69" which engages and which urges the control shaft 12b forwardly. Upon depression of the control knob 12 connected to the shaft 12b, contacts of the switch unit 69' are momentarily closed to generate a pulse for purposes to be described. Also, a previously indicated, rotation of the shaft 12 also generates control pulses at the terminals 90a-90b of the piezo-electric element 90.

As best shown in FIG. 6, the circuit board 155 has projecting forwardly therefrom a light unit 167 including a light source 167', which may be a light emitting diode which extends into light tube 9" anchored to the front wall 10. As previously indicated, when the front sub-assembly 7A is mounted in place, the previously mentioned lens element 8 passes into the light tube 9" to key the position of the front sub-assembly 7A.

The assembly of the controller of the invention described in a wall switch opening is carried out in a manner now to be described. First of all, as previously described, the rear sub-assembly is first electrically connected to conductors 60-60' as shown in FIG. 3, and is then physically anchored to the eyelets 44-44' by the screws 54-54'. Next, the cover plate 1 is placed over the wall switch opening involved and is aligned and then anchored by the screws 3a—3a as shown in FIG. 1. The front sub-assembly 7A is then positioned over the cover plate 1 so that the key-forming lens element 8 extends through the cover plate aperture 9' and enters the light tube 9" and the tongues 128-128" enter cover plate slot 5'. With the knob 12 removed from the control shaft 12b to expose the opening 6" in the rear of the front sub-assembly 7A, the anchoring screw 3a" is threaded into place within the opening 11' in the front wall 10 of the rear sub-assembly 7B, which opening 11' is exposed through the cover plate slot 5' either before or after the screw 3a" is threaded in place, the other anchoring screw 3a' is passed through the front sub-assembly opening 6', where it passes through the lower cover plate opening 9 where it can be threaded into the opening 11 in the front wall 10 of the rear sub-assembly 7B. The knob 12 is then pushed fully into place over the end of the control shaft 12b which compresses coil spring 69.

Figure 10:
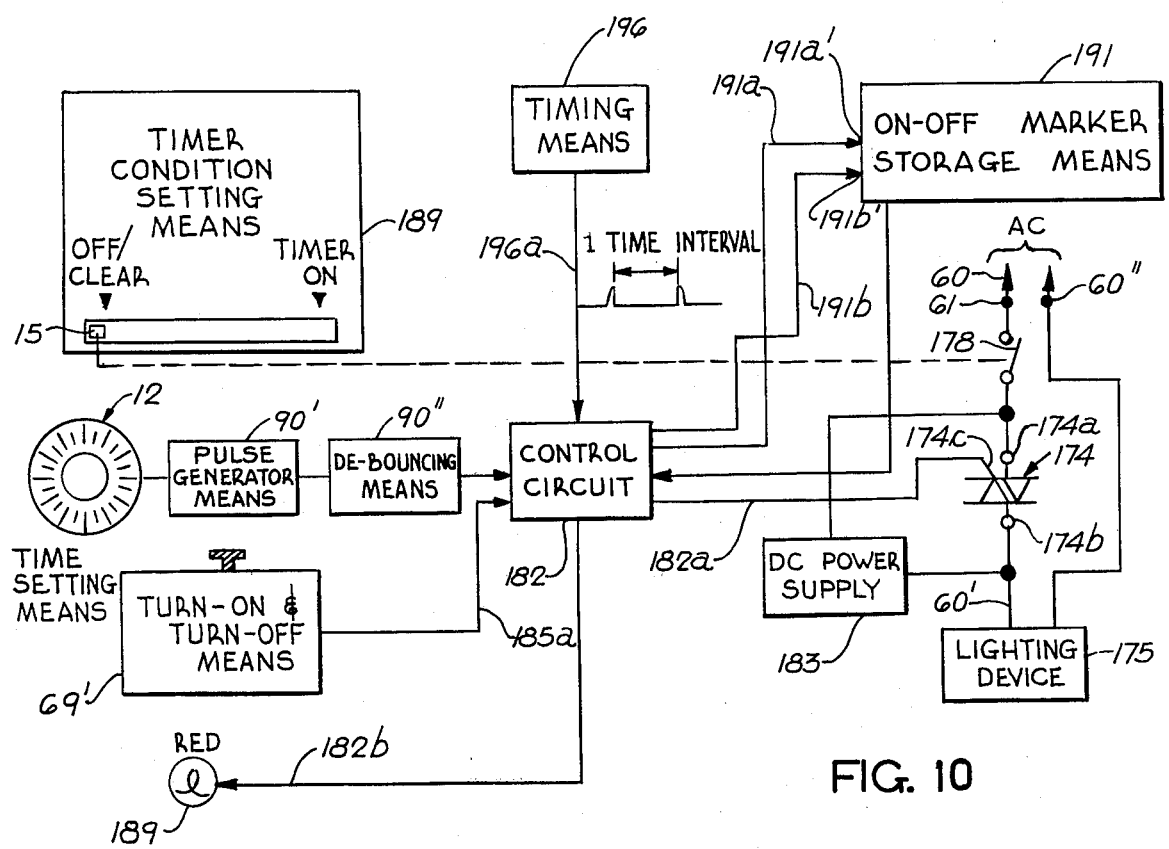
FIG. 10 is a simplified block diagram of the basic electrical components making up the electrical portions of an exemplary form of the invention.

Refer now to FIG. 10 which shows a simplified block diagram of the basic electrical and mechanical elements of the controller. It should be understood that the circuitry utilized may take any number of forms, such as the form disclosed in said co-pending application Ser. No. 022,453 as disclosed in a detailed block diagram shown in FIG. 9 thereof and described fully in that application. As there shown, a power switch 174, (readable upon "rearwardly projecting means" in the claims) and which is shown as a triac, has load terminals 174a-174b and a control or gate terminal 174c. One load terminal 174a is connected through a power on-off switch 178 to conductor 61 connected to conductor 60 extending to an AC power line. The other load terminal 174b is connected to one load terminal of a load device or circuit 175 which is generally a lighting circuit. The other terminal of this device or circuit connects with the power conductor 60".

The gate 174c of the triac is connected to a control circuit 182 by a control line 182a which renders the triac conductive or non-conductive as called for by operation of the timer. When the control circuit is to render the triac conductive, trigger pulses appear each half cycle on control line 182a extending to the gate 174c of the triac which causes the triac to be conductive each half cycle as the applied AC voltage reaches a threshold voltage (usually about 5 volts). When the triac is to be non-conductive, the trigger pulses disappear from the control line 182a.

In a wall switch opening, there is only available one conductor 60 directly extending to the AC power line. The other conductor 60' extends to the lighting device or power circuit involved. It is necessary, therefore, to include within the timer circuitry, a DC power supply circuit 183 shown in FIG. 10 which includes rectifiers and a capacitor which "steals" power for charging the capacitor during the less than 10° of each half cycle of conduction of the triac 174 when the triac is conducting to obtain the necessary power to operate the various circuits shown in FIG. 10. There are many DC power supplies of this type known in the prior art. However, one especially useful DC power supply is disclosed in copending application Ser. No. 060,578 filed July 25, 1979 now U.S. Pat. No. 4,270,058.

The time dial knob 12 is used as a push button on-off switch control when depressed and as a manual programming means when rotated and depressed during the programming of the timer. Successive depressions of the knob 12 alternately operates the triac 174 between conductive and non-conductive states by operating the aforesaid switch 69' identified as a turn-on and turn-off means 69' in FIG. 10. The manually operable turn-on and turn-off means 69' may be a momentarily operable switch producing a pulse on each depression which is coupled by conductor means 185a extending to control circuit 182. Each pulse may, for example, charge the state of a toggle bistable (not shown) which determines the signal condition on line 182a extending to the gate 174c of triac 174 and the signal fed to marker signal input terminal 191a' of storage means 191 via a control line 191a from control circuit 182.

The condition setting arm 15 is shown as part of what is sometimes referred to as condition setting means 189 which sets the timer system into either the OFF/CLEAR or TIMER-ON modes previously described. When the arm 15 is set in its OFF/CLEAR position, switch 178 between conductor 61 and triac load terminal 174a is opened to disconnect power from the timer. All existing bistable and other circuits are cleared or reset so that when power is re-established all circuits are in a reference or reset state when the timer condition setting arm 15 is moved from the OFF/CLEAR position. The timer setting means 189 could, as disclosed in said co-pending application Ser. No. 22,453, have a separate TIMER-OFF position which disables operation of the control circuit 182 by the markers stored in marker storage means 191 so that depression of knob 12 solely controls the operation of the triac 174 in the manner of an ordinary push button wall switch. However, entry into and exit from a TIMER-OFF mode of operation is most conveniently achieved by a distinctive depression sequence of the knob 12, such as two quick successive depressions thereof in less than one second. The control circuit 182 includes timer circuits which sense such a quick depression sequence. The reason for this preferred circuit logic is that the arm 15 is only moveable for a limited horizontal distance because of the constraints placed on such movement by the narrow cover plate slot 5' through which passes the switch actuating tongue 16. Also, the operation of a switch like switch 158 between two rather than three distinct positions enables the use of an inexpensive conventional two-position switch.

The marker storage means 191 has a number of storage locations in which timer-on and timer-off markers can be stored indicating the particular time interval or intervals of a 24 hour period during which the triac 174 can selectively automatically be rendered conductive or non-conductive. The "markers" can be binary digits "1" and "0" stored in individual stages of a shift register forming storage means 191 in the most preferred and advantageous form of the invention. (In such case, terminal 191b' becomes a shift pulse terminal and terminal 191a' becomes the outer input terminal of the shift register.) However, in accordance with a much less preferred but possible form of the invention, these markers can be other informational data in the storage locations of a random access memory unit. The storage means 191 has a data output line 191a extending to the control circuit 182. Power switch operating signals on line 191a derived from the markers stored in the storage means 191 effect operation of the triac 174 only when the timer is operating in its TIMER-ON mode of operation.

Programming of the invention (i.e., the process of inserting markers in the storage locations of the marker storage means 191) can be effected in the most preferred forms of the invention in two different ways, one way being a fast programming and the other way being a real time programming of the timer system. The real time programming of the timer system is effected by simply operating the arm 15 first to its OFF/CLEAR position and then to the TIMER-ON position. Then, an on or off marker is set automatically in the storage location of the storage means 191 identifying each time interval over the first 24 hour operating period of the timer system in accordance with the depression of the knob 12. Thereafter, no programming can take place until the arm 15 is returned to its OFF/CLEAR position. The fact that the timer is in the process of being programmed during the first 24 hour period of the timer system operation after movement of the control arm 15 from its OFF/CLEAR to its TIMER-ON position may be indicated by energization or de-energization of a lamp 184. After this 24 hour programming period has terminated, the lamp 184 assumes an opposite state. It is preferred that the programmed state be an energized state. FIG. 10 shows control circuit output conductor means 182b extending between control circuit 182 and light source 184 to control the same in this manner.

As previously indicated, rapid programming of the timer is made possible by the time dial knob 12 which has at its periphery the hour and half-hour indicating indicia or markers which are alignable with the index mark 13 on the control planel 6. An individual timing pulse identifying the beginning of a manually programmable half-hour time interval is generated by the time knob 12 as it is rotated a distance to bring a new indicia or marker opposite the reference index mark 13. An ON or OFF marker is then set in the appropriate storage location of the storage means corresponding to the then actual operating condition of the lighting device 175. If there is to be a change in the energized condition of the device 175 from that desired for the previous timing interval, then the knob 12 is depressed to change this condition.

As previously indicated, each step in the advancement of the knob 12 causes the piezo-electric element 90 shown in FIG. 10 as pulse generating means 90 to generate a voltage pulse or decaying pulse train, in turn, fed to a de-bouncing means 90''. The de-bouncing means may be a conventional circuit which generates a single pulse from any quick succession of multiple pulses which may be generated by a single shock excitation of the piezo-electric element 90 by the spring 85 in the manner previously described. Each de-bounced pulse is fed from de-bouncing means 90'' to the control circuit 182 to provide a suitable control signal fed via a control line 191b extending to an accessing signal input terminal 191b' of storage means 191, to address a new storage location for marker entry, or readout in the case of programming and marker readout, should the marker pattern in the storage means 191 be read from the storage means during a program readout operation. During manual programming, as previously indicated, an ON-marker or OFF-marker is stored in the accessed storage location of storage means 191 upon each depression of the knob 12 which changes the condition of the lighting device 175 and the signal at marker signal input terminal 191a'.

The timer-controller may also be designed to automatically store markers in the storage means 191 in accordance with the pattern of normal operation of the knob 12 used as an ON-OFF push button control during the first 24 hour programming period of the timer. For this purpose (and for any normal real time access of the storage means 191 where the markers are fed from the storage means to the control circuit 182 during TIMER-ON operation) access to the storage means 191 is obtained through timing pulses generated by timing means 196. These timing pulses produced on an output conductor means 196a are spaced apart by the duration of the basic programmable time interval, one-half hour in the example of the invention being described. The output conductor 196a is shown extending to the control circuit 182. Even when the condition setting arm 15 is operated to the TIMER-ON condition, depression of the knob 12 will override the control function called for by the markers in the storage locations of the storage means 191 assigned to the time interval involved.

The present invention has provided a functional, flexible, reliable and easy to install, program and use timer-controller which can be mounted in place of and functionally replace a conventional toggle wall switch in a single or multiple wall switch station where the conventional wall switch cover plate occupies its normal position over the wall switch opening.

I claim:

1. Power control apparatus comprising: a rear sub-assembly to be mounted in a wall switch opening which usually includes a toggle on-off switch unit with a forwardly projecting operating arm therefor; a front sub-assembly to be mounted over a cover plate to extend over said wall switch opening and having a vertical slot designed to receive said toggle switch arm and a pair of screw-receiving openings on opposite sides of said slot; said front sub-assembly having key-forming means permanently extending from the rear thereof and passable through one of said screw-receiving openings in said cover plate acting as a keying aperture and being rendered thereby unusable as a screw-receiving means; first fastener-receiving means on said rear sub-assembly positioned to be accessible from the front of said front sub-assembly through said cover plate slot from the front of said front sub-assembly; first fastener means for engaging said first fastener receiving means for anchoring said front sub-assembly and cover plate to said rear sub-assembly through said cover plate slot; circuitry in said rear sub-assembly; said circuitry including controlled means operable to different power controlling conditions, and control means for controlling the operation of said controlled means; manually operable means which extends from said rear sub-assembly and is extendable through said cover plate slot and the front sub-assembly for controlling said control means; and a manually engageable means on the front of said manually operable means.

2. The power control apparatus of claim 1 wherein said rear sub-assembly includes means for securing the rear sub-assembly to a switch box commonly found in said wall switch opening.

3. The power control apparatus of claim 1, or 2, wherein said manually engageable means covers said first fastener means when the apparatus is assembled, and the said manually engageable means is removable from said manually operable means to expose said first fastener means, so that the first fastener means then can be released to permit removal of said front sub-assembly and said cover plate from the rear sub-assembly.

4. The power control apparatus of claim 1 or 2, including an additional manually engageable means on said front sub-assembly which additional means is connectable through said cover plate slot to said control means in said rear sub-assembly.

5. The power control apparatus of claim 1 wherein said keying means is a lens unit visible from the front of the front sub-assembly in alignment with said one screw-receiving opening of the cover plate, and said control means in the rear sub-assembly includes light-producing means which when energized directs its light through said lens unit and screw-receiving openings to identify a function being performed by said control means.

6. The power control apparatus of claim 1 combined with said cover plate and wherein there is provided a second fastener-receiving means on said rear sub-assembly and accessible from the front sub-assembly through one of said screw-receiving openings in said cover plate, and second fastener means for engaging said second fastener-receiving means through the latter opening from the front of said front sub-asembly for further anchoring said front sub-assembly to said rear sub-assembly.

7. The power control apparatus of claim 6 wherein said first and second fastener-receiving means are threaded openings in said rear sub-assembly, and said first and second fastener means are screws respectively adapted to pass into said threaded openings respectively through said cover plate slot and another opening in said cover plate.

8. The combination of claim 6 wherein said second fastener means passes through the screw-receiving opening other than the one receiving said key-forming means.

9. The power control apparatus of claim 1, 2, or 5 wherein said manually operable means is a single control member which extends from said rear sub-assembly and is adapted to pass through said cover plate slot and said front sub-assembly, and said manually engageable means is removably mounted on the front of said manually operable means at the front of said front sub-assembly and when removed therefrom exposes an opening for receiving said first fastener means.

10. Power control apparatus comprising: a rear sub-assembly to be mounted in a wall switch opening which usually includes a toggle on-off switch unit with a forwardly projecting operating arm therefor; a front sub-assembly to be mounted over a cover plate to extend over said wall switch opening and having a slot designed to receive said toggle arm; first fastener-receiving means on said rear sub-assembly positioned to be accessible from the front of said front sub-assembly through said cover plate slot from the front of said front sub-assembly; first fastener means for engaging said first fastener-receiving means for anchoring said front sub-assembly to said rear sub-assembly through said cover plate slot; circuitry in said rear sub-assembly, said circuitry including controlled means operable to different power controlling conditions and control means for controlling the operation of said controlled means, said control means forming a timer which generates control signals at various time intervals over a 24 hour period which effects operation of said controlled means in accordance with said signals; and manually operable means which extends from said rear sub-assembly and is extendable through said cover plate slot and the front sub-assembly for controlling said control means, and manually engageable means on the front of said manually operable means, said manually operable means and the manually engageable means thereon being a rotatable and depressible assembly which effects the programming of said timer in accordance with the depression and rotation thereof.

11. Power control apparatus comprising: a rear sub-assembly to be mounted in a wall switch opening which usually includes a toggle on-off switch unit with a forwardly projecting operating arm therefor; a front sub-assembly to be mounted over a cover plate to extend over said wall switch opening and having a slot designed to receive said toggle arm; first fastener-receiving means on said rear sub-assembly positioned to be accessible from the front of said front sub-assembly through said cover plate slot from the front of said front sub-assembly; first fastener means for engaging said first fastener-receiving means for anchoring said front sub-assembly to said rear sub-assembly through said cover plate slot; circuitry in said rear sub-assembly, said circuitry including controlled means operable to different power controlling conditions and control means for controlling the operation of said controlled means, said control means forming a timer which generates control signals at various time intervals over a 24 hour period which effects operation of said controlled means in accordance with said signals, and manually operable means which extends from said rear sub-assembly and is extendable through said cover plate slot and the front sub-assembly for controlling said control means, and manually engageable means on the front of said manually operable means, said manually operable means and the manually engageable means effecting the programming of said timing means in accordance with the operation thereof.

12. Power control apparatus comprising: a rear sub-assembly mounted in a wall switch opening which usually includes a toggle on-off switch unit with a forwardly projecting operating arm therefor; a cover plate over said opening and including a vertical slot designed to receive said toggle switch; a front sub-assembly mounted over said cover plate; a switch box in said wall switch opening, said switch box having threaded holes, screw means passing through said rear sub-assembly from the front thereof and engaging with said threaded holes to anchor said rear sub-assembly to said switch box; first fastener-receiving means on said rear sub-assembly accessible from the front of said front sub-assembly through said cover plate slot and an opening in said first fastener means engaging said first fastener-receiving means through said front sub-assembly opening and cover plate slot for anchoring said front sub-assembly and cover plate to said rear sub-assembly through said cover plate slot; circuitry in said rear sub-assembly, said circuitry including controlled means operable to different power controlling conditions and control means for controlling the operation of said controlled means; manually operable means which extends from said rear sub-assembly through said cover plate slot and the front sub-assembly for controlling said control means, and manually engageable means on the front of said manually operable means.

13. The power control apparatus of claim 12 wherein said fastener-receiving means includes a threaded opening in said rear sub-assembly and said fastener means includes a screw adapted to pass into said threaded opening through said cover plate slot and said front sub-assembly.

14. The power control apparatus of claim 12 wherein said manually engageable means and manually operable means constitute a rotatable and depressible assembly.

15. The power control apparatus of claim 12 wherein said cover plate has screw-receiving openings on opposite sides of said cover plate slot, said front sub-assembly has keying means permanently therefrom and passing into one of screw-receiving holes rendering them unusable to receive an anchoring screw.

16. The power control apparatus of claim 12 wherein said cover plate has one or more screw-receiving openings, said rear sub-assembly has a second threaded opening, and there is provided a screw passing through at least one of said screw-receiving openings of said cover plate and threaded into said second threaded opening to anchor said cover plate to said rear sub-assembly.

17. The power control apparatus of claim 1 or 12 wherein said front sub-assembly has rearwardly projecting means positioned to fit within and be adjacent opposite ends of said cover plate slot to aid in the positioning of said front sub-assembly on said cover plate.

18. The power control apparatus of claim 12 wherein said manually operable means is a rotatable shaft and said manually engageable means includes an outer knob member coupled to said shaft through an inner knob member, means interconnecting said outer knob member to said inner knob member so that said inner knob member is rotated by said outer knob member in only one direction of rotation thereof, and there is visible along the periphery of said outer knob member numbered markings identifying at least the hour numbers 1 through 12, and an index mark opposite which a different numbered marking becomes aligned in progressively increasing value as said outer knob member is advanced in said one direction, and said rear sub-assembly including detenting means engageable with said shaft for constraining said shaft for movement in discrete steps representing hour or fraction hour advancement thereof where said numbered markings or fractional hour markings become aligned with said index mark.

19. The power control apparatus of claim 18 wherein said control means in said rear sub-assembly includes storage location accessing signal generating means for generating a signal during the movement of said shaft into each new detented position, storage location accessing means responsive to each of said accessing signals for accessing a different marker storage location in said storage means, means for urging said shaft and knob assembly carried thereby into an outer position so the shaft is depressible as well as rotatable, and means in said rear subassembly responsive to the manual depression of said shaft for generating a marker setting and power switch operating signal which changes the condition of said controlled means, and, during the programming of the apparatus, sets an on or off marker in the accessed storage location of the storage means corresponding to the condition of the controlled means effected by the depression of said shaft.

20. The power control apparatus of claim 18 wherein said rear sub-assembly includes a parts mounting body into which said control shaft extends, said detenting means includes a ratchet member rotatable in said parts mounting body and connected to said control shaft so the rotation of the control shaft rotates the ratchet member, and means engageable with said ratchet member for detenting the movement of said control shaft.

21. The power control apparatus of claim 20 wherein said detenting means which engages said ratchet member also constitutes an operating member for generating each of said storage location accessing signals, and signal generating means mounted in said parts mounting body and responsive to the movement of said detenting means.

22. In a timer system having storage means having storage locations into which circuit opening and circuit closing markers are to be set, storage location accessing signal input terminal means for receiving said signals which progressively access storage locations representing successive time intervals over a 24 hour period and marker signal input terminal means for receiving signals indicating whether a circuit opening or closing marker is to be set into the accessed storage location, the improvement in manually operable control means for selecting the storage location of said storage means into which one of said markers may be set, said manually operable control means including a rotatable control shaft, an outer knob member coupled to said control shaft so that said control shaft is rotated only when said outer knob member is rotated in one direction, numbered markings visible along the periphery of said outer knob member which numbered markings identify at least the hour numbers 1 through 12, and an index mark opposite which a different numbered marking becomes aligned in progressively increasing value as said knob member is advanced in said one direction, and signal generating means for generating a signal during the movement of said shaft into each new position aligning said index mark with the next marking, and control means responsive to each of said signals for accessing a marker storage location in said storage means associated with the time interval beginning with the time opposite the index mark.

23. The timer system of claim 22 which is provided with detenting means engageable with said shaft for constraining said shaft for rotation in said one direction in discrete steps representing hour or fractional hour advancement thereof where said numbered markings or fractional hour markings become aligned with said index mark.

24. The timer system of claim 22, wherein said outer knob member is carried on said control shaft, and there is provided means for urging said control shaft and knob member into an outer position so the shaft and knob member are depressible as well as rotatable, and means responsive to each manual depression of said control shaft for feeding to said marker signal input terminal means of said storage means a signal which changes the marker type stored in the storage location associated with the time interval beginning with the time represented by the numbered marking opposite said index mark from that placed in the storage location associated with the preceding time interval.

25. The timer system of claims 22, 23 or 24, wherein said outer knob member is mounted over an inner knob member secured to said central shaft and is coupled to said inner knob member so that it drives said inner knob member when rotated in said one direction and slips with respect thereto when rotated in the opposite direction.

26. Power control apparatus comprising: a rear sub-assembly to be mounted in a wall switch opening which usually includes a toggle on-off switch unit with a forwardly projecting operating arm therefor; a front sub-assembly to be mounted over a cover plate to extend over said wall switch opening and having a slot designed to receive said toggle arm; first fastener-receiving means on said rear sub-assembly positioned to be accessible from the front of said front sub-assembly through said cover plate slot from the front of said front sub-assembly; first fastener means for engaging said first fastener-receiving means for anchoring said front sub-assembly to said rear sub-assembly through said cover plate slot; circuitry in said rear sub-assembly, said circuitry including controlled means operable to different power controlling conditions and control means for controlling the operation of said controlled means; manually operable means which extends from said rear sub-assembly and is extendable through said cover plate slot and the front sub-assembly for controlling said control means, and first manually engageable means on the front of said manually operable means, said manually operable means being depressible and rotatable and associated with indicia representing various time intervals over a 24 hour period, said manually operable means being rotatable into discrete positions representing said various time intervals, and said circuitry further including signal generating means for generating a programming signal as said manually operable means is moved to each discrete position, timing means for generating timing signals at said various time intervals, marker storage means responsive to said programming signals and the depression of said manually operable means by storing markers in storage locations thereof representing the desired condition of said controlled means during said time intervals, and means responsive to said timing signals and said markers for effecting operation of said controlled means in accordance with the markers in said storage means.

27. Power control apparatus comprising: a rear sub-assembly to be mounted in a wall switch opening which usually includes a toggle on-off switch unit with a forwardly projecting operating arm therefor; a front sub-assembly to be mounted over a cover plate to extend over said wall switch opening and having a slot designed to receive said toggle arm; first fastener-receiving means on said rear sub-assembly positioned to be accessible from the front of said front sub-assembly through said cover plate slot from the front of said front sub-assembly; first fastener means for engaging said first fastener-receiving means for anchoring said front sub-assembly to said rear sub-assembly through said cover plate slot; circuitry in said rear sub-assembly, said circuitry including controlled means operable to different power controlling conditions and control means for controlling the operation of said controlled means; manually operable means which extends from said rear sub-assembly and is extendable through said cover plate slot and the front sub-assembly for controlling said control means, and first manually engageable means on the front of said manually operable means, and an additional manually engageable control means on said front sub-assembly and which is connectable through said cover plate slot to said control means in said rear sub-assembly, said additional manually engageable means being a shiftable member mounted for pivotable movement on said front sub-assembly and having a projecting end exposed on the front of said front sub-assembly, said rear sub-assembly having a pivotally mounted member with a tongue projecting forwardly and adapted to pass through said cover plate slot and into an opening in said shiftable member or said front sub-assembly.

28. Power control apparatus comprising: a rear sub-assembly to be mounted in a wall switch opening which usually includes a toggle on-off switch unit with a forwardly projecting operating arm therefor; a front sub-assembly to be mounted over a cover plate to extend over said wall switch opening and having a slot designed to receive said toggle arm; first fastener-receiving means on said rear sub-assembly positioned to be accessible from the front of said front sub-assembly through said cover plate slot from the front of said front sub-assembly; first fastener means for engaging said first fastener-receiving means for anchoring said front sub-assembly to said rear sub-assembly through said cover plate slot; circuitry in said rear sub-assembly, said circuitry including controlled means operable to different power controlling conditions and control means for controlling the operation of said controlled means; manually operable means which extends from said rear sub-assembly and is extendable through said cover plate slot and the front sub-assembly for controlling said control means; and manually engageable means on the front of said manually operable means, said manually engageable means being a knob; indicia around the periphery of the knob identifying at least the hour numbers 1 through 12; a stationary index mark opposite which said indicia can be aligned; an indicating member in said front sub-assembly which member has an "AM" or "PM" marking visible through window means in the front of said front sub-assembly, depending upon the position thereof; and means responsive to each full rotation of said knob for shifting the position of said indicating member to expose a different one of said markings.

* * * * *